Patented May 8, 1951

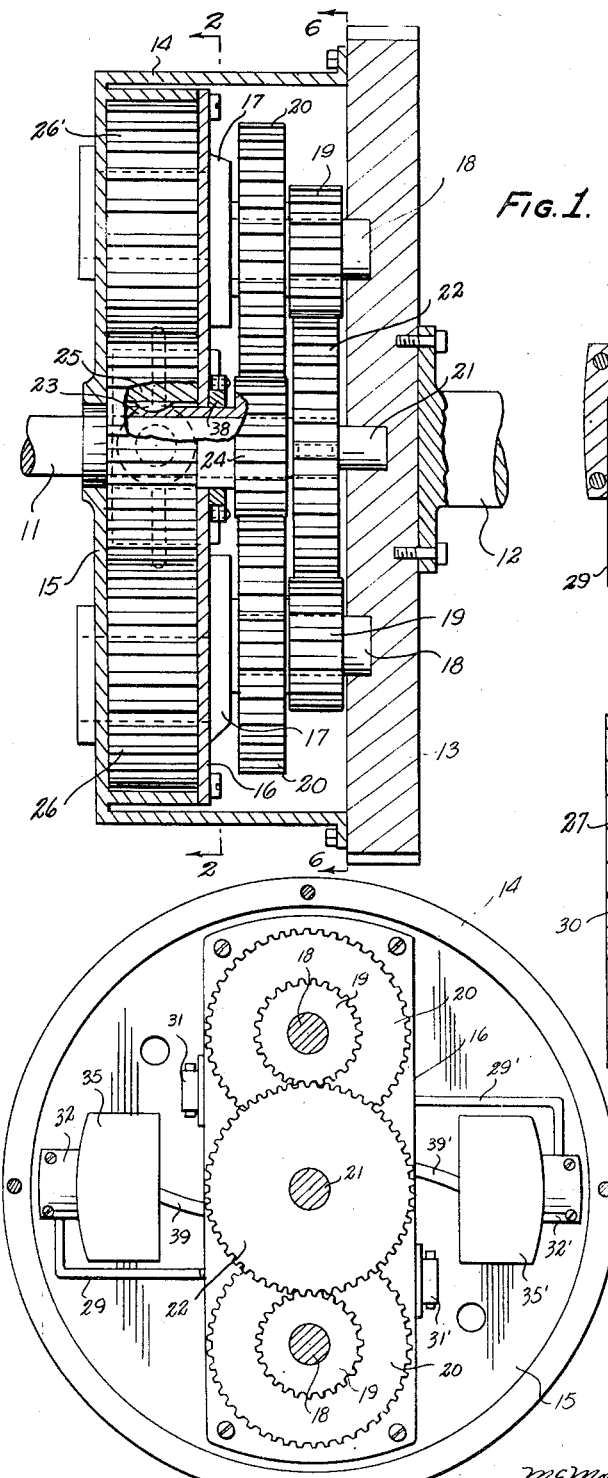

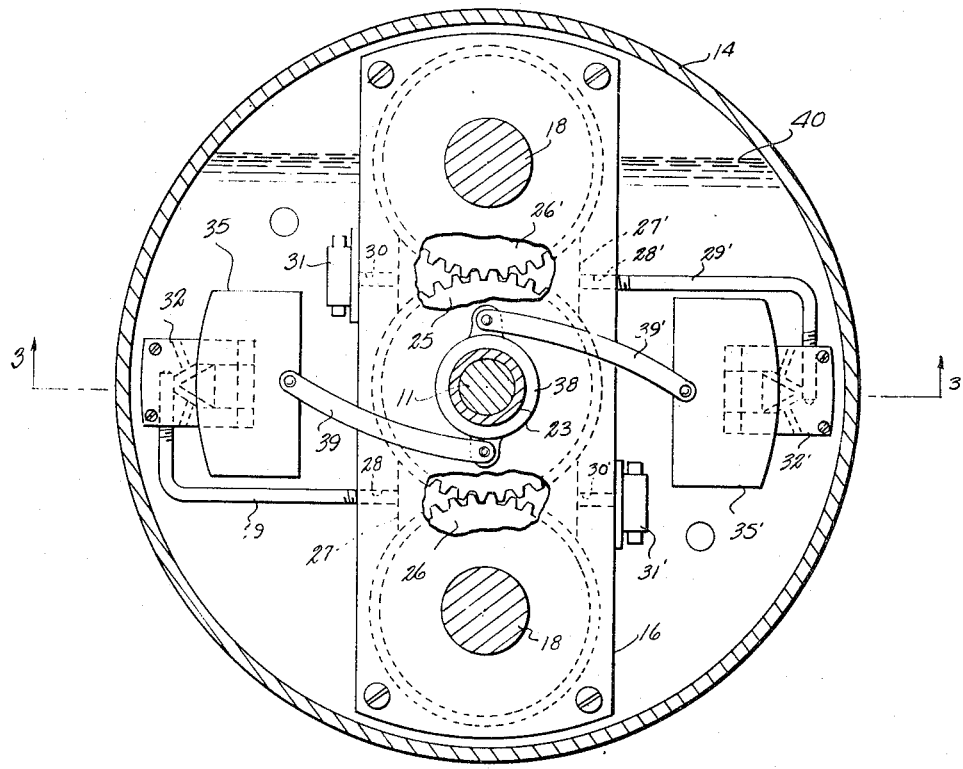
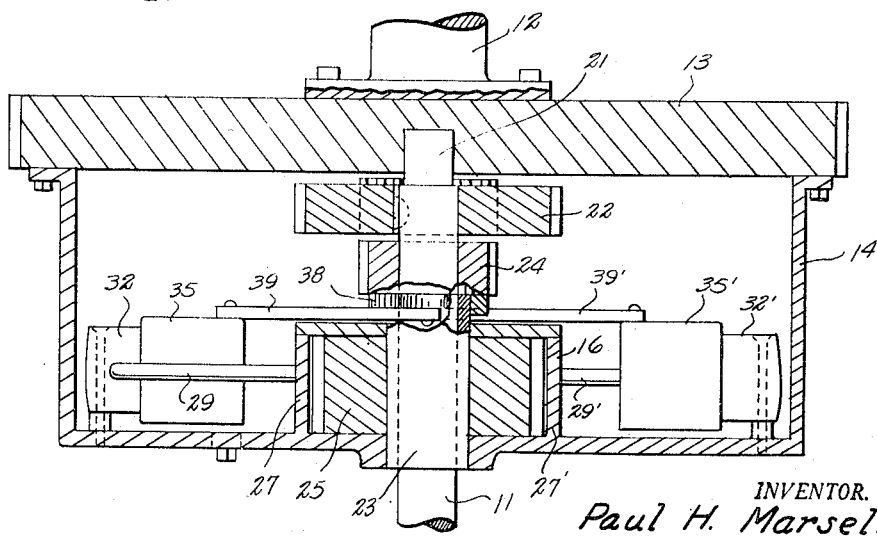

2,552,010

UNITED STATES PATENT OFFICE 2,552,010

COMBINED TORQUE CHANGER AND VARIABLE SPEED TRANSMISSION

Paul H. Marsell, Cortez, Colo.

Application June 28, 1949, Serial No. 101,777

2 Claims. (Cl. 74—794)

This invention relates to transmission devices, and more particularly to a variable speed transmission of the fluid type.

A main object of the invention is to provide a novel and improved combined torque changer and variable speed transmission of the fluid type which is very simple in construction, reliable in operation, adapted to provide high starting torque for starting a load from a condition of rest, and providing selective speeds from the initial condition up to the final condition, wherein the driven shaft of the transmission rotates at the same speed as the driving shaft.

A further object of the invention is to provide an improved variable speed transmission of the fluid type especially adapted for use on motor vehicles or the like, said transmission involving only a few parts, being compact in size, relatively light in weight, and preventing coasting of the vehicle when the speed of the vehicle tends to exceed the driving speed afforded by the driving shaft thereof.

Further objects and advantages of the invention will become apparent from the following description and claims, and from the accompanying drawings, wherein:

Figure 1 is a vertical cross-sectional view taken through a transmission unit constructed in accordance with the present invention;

Figure 2 is a cross-sectional view taken on line 2—2 of Figure 1;

Figure 3 is a cross-sectional view taken on line 3—3 of Figure 2;

Figure 4 is an enlarged detail view, partly in cross-section, of one of the speed-responsive pump outlet valve elements employed in the transmission unit of Figure 1;

Figure 5 is an enlarged cross-sectional detail view of one of the inlet check valves employed with the gear pump of the transmission unit of Figure 1;

Figure 6 is a cross-sectional view taken on line 6—6 of Figure 1.

Referring to the drawings, 11 designates the driven shaft and 12 designates the driving shaft. Secured to the end of driving shaft 12 is the flywheel 13. Secured to flywheel 13 is the cylindrical housing 14. The housing 14 has an end wall 15 through the center of which shaft 11 rotatably and sealingly passes.

Diametrically secured to end wall 15 is the diametrically elongated pump housing 16, the transverse wall of said housing being formed with opposed bearing blocks 17, 17. Journaled in the respective bearing blocks 17 and the opposing portions of flywheel 13 are the respective shafts 18, 18. Each shaft 18 carries a small planetary gear 19 and a large planetary gear 20. The inner end of driven shaft 11 has a reduced portion 21 which is journaled axially in flywheel 13. Secured on shaft 11 adjacent the reduced portion 21 is a large sun gear 22 which meshes with the small planetary pinions or gears 19, 19.

Rotatably mounted on shaft 11 and extending rotatably through the pump housing 16 is a sleeve member 23 integrally formed at its inner end with a sun pinion 24 meshing with the large planetary gears 20, 20. Keyed on sleeve 23 within housing 16 is a pump gear 25. Journaled in the outer portions of housing 16 are respective additional pump gears 26, 26' meshing with gear 25.

The longer side walls of pump housing 16 are designated respectively at 27, 27'. Side wall 27 is formed between gears 25 and 26 with an outlet passage 28 to which is connected an outlet conduit 29. Side wall 27 is formed between gears 25 and 26' with an inlet passage 30 and mounted on the outer side of wall 27 is a check valve 31 communicating with passage 30, as shown in Figure 5, and allowing fluid to enter said passage from outside the housing 16, but preventing flow of fluid outwardly from the housing. Opposite inlet passage 30 the opposite side wall 27' is formed with an outlet passage 28' to which is connected an outlet conduit 29'. Opposite outlet passage 28 the side wall 27' is formed with an inlet passage 30', and the side wall 27' is provided with an inlet check valve 31' similar to check valve 31.

Secured to the ends of the respective outlet conduits 29 and 29' are the respective inwardly-facing radial cylindrical cup members 32 and 32'. As shown in Figure 4, each cup member is formed with a conical seat 33 and the wall of the cup member is formed with escape passages 34. Slidably mounted on the respective cup members 32 and 32' are the respective shoe members 35 and 35', each shoe member being formed with an axial stud 36 slidably fitting within the cup member and formed with a conical tip 37 fitting the conical seat 33. Rotatably mounted on sleeve member 23 adjacent housing 16 is a ring member 38. Pivotally connecting diametrically-opposed portions of ring member 38 to the respective shoes 35 and 35' are the respective link bars 39, 39'.

The housing 14 is substantially filled with a quantity of liquid, such as brake fluid or the like, shown at 40. When the driven shaft 11 is being started, said shaft is stationary and the driving shaft 12 rotates. This revolves gears 19, 19 around gear 22. Gears 20 transmit torque to gear 24, causing gear 24 to rotate at a much higher speed than shaft 12. Gear 25 drives gears 26 and 26', pumping fluid out of housing 16 through the conduits 29 and 29' and through the apertured cups 32 and 32'. Fluid enters housing 16 through the check valves 31 and 31'. As the speed of housing 14 and the fluid 40 carried therein builds up, the shoes 35 and 35' are rotated due to the torque exerted thereon by the fluid, and said shoes move outwardly by centrifugal force, whereby the cone tips 37 engage in their seats 33, closing off the cup members 32 and 32'. This produces high resistance to the rotation of the pump gears 25 and 26, 26'. The back torque is transmitted through gears 24, 20 and 19 to gear 22, causing gear 22 and shaft 11 to rotate. Eventually gears 25, 26 and 26' become locked, whereby gear 24 becomes substantially fixed with respect to housing 14, gears 20 and 19, likewise become fixed with respect to said housing, and gear 22, meshing with gears 19, 19 likewise becomes fixed with respect to said housing, causing driven shaft 11 to be directly coupled to driving shaft 12.

Should a heavy load be placed on shaft 11, rotation of housing 14 is momentarily retarded, releasing the fluid torque and reducing the centrifugal pressure on said shoes. Fluid is then allowed to flow out of passages 34 allowing the pump gears 25 and 26, 26' to rotate and allowing gear 26 to rotate relative to housing 14 until sufficient torque has been furnished by driving shaft 12 to restore the required speed of rotation of housing 14 to again close cup members 32, 32' and lock the pump gears. Under very heavy loads, the cup members 32, 32' will remain open allowing the driven shaft 11 to slip with respect to the driving shaft 12 without causing the engine connected to shaft 12 to stall.

When the driven shaft 11 tends to rotate faster than the driving shaft 12, as when the vehicle employing the device is traveling down hill, gear 24 is still held fixed with respect to housing 14 since fluid cannot flow reversely through housing 16 because of the check valves 31, 31', and coasting of the vehicle is, therefore, prevented.

As shown in Figure 5, each check valve comprises a body formed with the main passage 41 communicating with the passage 30 or 30' in the pump housing wall. The valve body is formed with a transverse passage 42 communicating with passage 41 and leading to respective side conduits 43, 43 covered by apertured caps 44, 44. Positioned in the end portions of passage 42 are the balls 45, 45, normally held inwardly by coil springs 46, 46 acting between the balls and the apertured caps 44. In their inwardly-biased positions, the balls 45, 45 do not prevent flow of fluid into passage 42 from the caps 44. When the fluid reverses in direction, the balls are seated over the bores of conduits 43, preventing outward flow of fluid from the valve.

While a specific embodiment of a combined torque changer and variable speed transmission has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a variable speed transmission, a hollow cylindrical housing containing liquid and having first and second end walls, a drive shaft fixed axially to said first end wall, a driven shaft journalled axially through said second end wall and extending axially through said housing and journalled on said first end wall, a pump casing in said housing adjacent to said second end wall, said pump casing being traversed by said driven shaft, a sleeve journalled on said driven shaft within said housing, a pump gear keyed on said sleeve within said pump casing, other pump gears journalled in said pump casing and meshed with the first mentioned pump gear, planetary shafts mounted on said first housing endwall having planetary pinions thereon, a sun gear keyed on said driven shaft and meshed with said pinions, planetary gears fixed on said planetary shafts, a sun pinion fixed on said sleeve and meshed with said planetary gears, inlet check valve means providing only inlet communication between the interior of said housing and the interior of said pump casing, and normally open centrifugally closable outlet valve means providing only outlet communication between the interior of said pump casing and the interior of said housing.

2. In a variable speed transmission, a hollow cylindrical housing containing liquid and having first and second ends walls, a drive shaft fixed axially to said first end wall, a driven shaft journalled axially through said second end wall and extending axially through said housing and journalled on said first end wall, a pump casing in said housing adjacent to said second end wall, said pump casing being traversed by said driven shaft, a sleeve journalled on said driven shaft within said housing, a pump gear keyed on said sleeve within said pump casing, other pump gears journalled in said pump casing and meshed with the first mentioned pump gear, planetary shafts mounted on said first housing endwall having planetary pinions thereon, a sun gear keyed on said driven shaft and meshed with said pinions, planetary gears fixed on said planetary shafts, a sun pinion fixed on said sleeve and meshed with said planetary gears, inlet check valve means providing only inlet communication between the interior of said housing and the interior of said pump casing, and normally open centrifugally closable outlet valve means providing only outlet communication between the interior of said pump casing and the interior of said housing, said outlet valve means comprising cylinders mounted on said pump casing having bores formed with valve seats, said cylinders being formed with outlet passages providing communication between the bores in the region of the valve seats and the interior of the housing, shoes mounted on said cylinders having pistons slidable in said bores and having tips for engagement with the seats to partially or fully close said outlet passages only when said shoes are displaced from normal positions by the action of centrifugal force, and means coupling said shoes together for coordinate movement.

PAUL H. MARSELL.

REFERENCES CITED

The following references are of record in the file of this patent:

UNITED STATES PATENTS

| Number | Name | Date |
|---|---|---|
| 1,658,021 | Smith | Jan. 31, 1928 |
| 1,820,083 | Miller | Aug. 25, 1931 |
| 1,835,318 | Miller | Dec. 8, 1931 |
| 2,019,849 | Foster | Nov. 5, 1935 |
| 2,026,777 | Dumble | Jan. 7, 1936 |
| 2,102,131 | Schmid | Dec. 14, 1937 |
| 2,250,082 | Robinson | July 22, 1941 |
| 2,318,028 | Thomas | May 4, 1943 |
| 2,377,350 | Marsh | June 5, 1945 |